No. 749,639. PATENTED JAN. 12, 1904.
M. STERNBERG.
BALL AND SOCKET FASTENER.
APPLICATION FILED APR. 28, 1903.
NO MODEL.
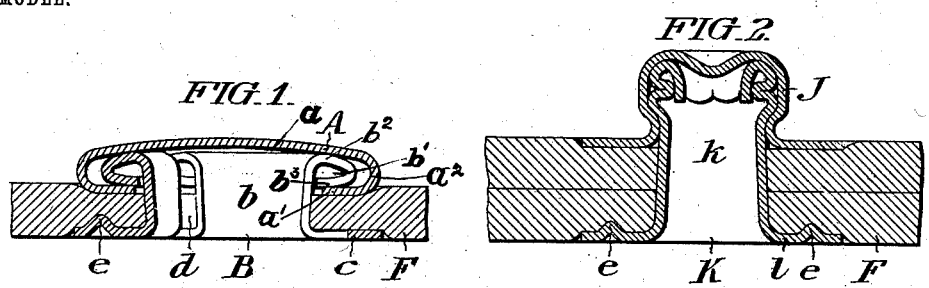
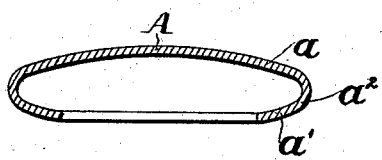
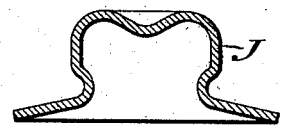
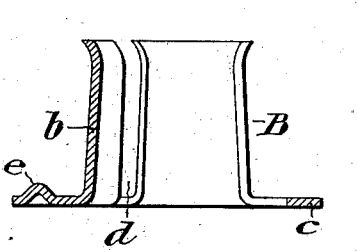
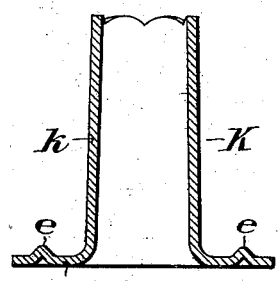
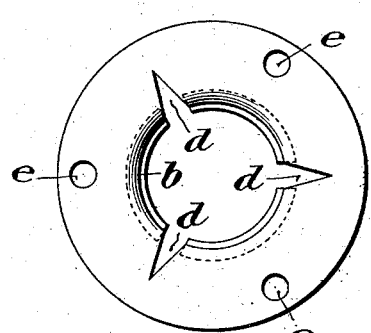
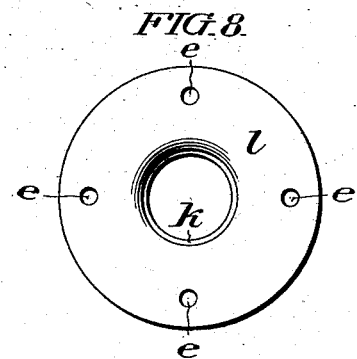
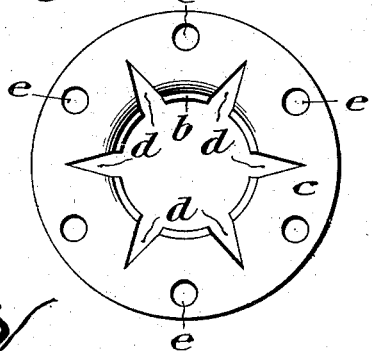
WITNESSES: INVENTOR:
Marc Sternberg No. 749,639.

Patented January 12, 1904.

UNITED STATES PATENT OFFICE.

MARC STERNBERG, OF PHILADELPHIA, PENNSYLVANIA, ASSIGNOR TO METALLIC SPECIALTY MANUFACTURING COMPANY, A CORPORATION OF NEW JERSEY.

BALL-AND-SOCKET FASTENER.

SPECIFICATION forming part of Letters Patent No. 749,639, dated January 12, 1904.

Application filed April 28, 1903. Serial No. 154,669. (No model.)

*To all whom it may concern:*

Be it known that I, MARC STERNBERG, a citizen of the United States, residing at No. 1639 North Thirty-third street, in the city of Philadelphia, county of Philadelphia, and State of Pennsylvania, have invented certain new and useful Improvements in Ball-and-Socket Fasteners, of which the following is a specification, reference being had to the accompanying drawings.

My invention relates to ball-and-socket fasteners used for gloves, suspenders, and other articles, in which the required resilience to hold the fastener is provided in the socket member. According to my invention I secure this resilience by crowding into the cap a socket-eyelet, of which the sleeve is slotted from its upper end downward, while the flange is integral. In this way I make a resilient socket member consisting of only two parts, in which neither the cap nor the flange between which the fabric is held is required to move when the socket yields to admit the stud of the fastener.

As a further improvement I indent the flange of the eyelet in both the socket and the stud member, and thereby prevent rotation of the fastener and increase its hold on the fabric.

In the accompanying drawings, Figure 1 is a sectional view of the socket member constructed according to my invention. Fig. 2 is a sectional view of the stud member. Fig. 3 is a similar view of the cap of the socket member. Fig. 4 is a similar view of the ball portion of the stud member. Fig. 5 is a similar view of the eyelet of the socket member. Fig. 6 is a similar view of the eyelet of the stud member. Fig. 7 is a base view of the eyelet of the socket member. Fig. 8 is a base view of the eyelet of the stud member. Fig. 9 is a similar view of a modified form of eyelet to be used in the socket member.

As I have illustrated my fastener, each of the members is composed of only two parts; but a socket member made according to my invention is capable of being used with other sorts of studs.

I will first describe the socket member as illustrated in Figs. 1, 3, 5, and 7. A is the cap, which is struck from a single piece of metal and has the contour shown in Fig. 3— that is to say, it has the rounded top $a$ and the inwardly-extending lower rim $a'$, surrounding the opening which receives the sleeve of the eyelet, as hereinafter described, the top and lower rim being connected by curved side walls $a^2$, the interior diameter of the cap— that is, the distance between diametrically opposite points of the side walls $a^2$—being greater than the diameter of the opening. B is the socket-eyelet, consisting of a sleeve $b$ and a flange $c$. The upper end of the sleeve flares slightly to provide for its expansion within the cap, as hereinafter described. A number of open slots $d\ d\ d$ (three are shown in the drawings) are made in the sleeve of the eyelet. These extend from its upper end throughout its entire length and turning at the shoulder into the flange pass about half-way across it, terminating far enough from the rim to maintain the substantial integrity and strength of the flange unimpaired. I prefer that the base of each slot in the flange should take the pointed form shown in Fig. 7, but the shape may vary. At points around the flange, preferably equidistant between the bases of the slots, I indent the flange with points $e\ e\ e$ projecting upward.

To unite the parts of the socket member and fasten them to the fabric F, Fig. 1, the eyelet B is put through a suitable hole in the fabric and the cap A is placed over the upper end of the sleeve. Pressure is now applied which results in expanding the upper end of the sleeve of the eyelet within the cap. During this process the cap is slightly flattened, and at the same time the flared and slotted end of the sleeve curls outwardly and downwardly, assuming within the cap somewhat the position shown in Fig. 1, in which the extremities of the sleeve have bent over until they have come in contact with the lower rim of the cap where they lie just within its inner edge, forming a hollow flange $b'$, which is in contact with the inner surface of the top of the cap at $b^2$ and in contact with the inner face of the lower rim at $b^3$, the extreme diameter of the hollow flange $b'$ being less than the inner diameter of the cap, so that the hollow flange is surrounded within the cap by an annular space, in which it may yield freely outward. This operation binds the fabric between the lower side of the cap and the flange of the eyelet, the indented points $e\ e\ e$ entering sufficiently into the fabric to materially increase the hold of the completed socket member upon it and effectually prevent rotation.

It will be noted that the upper ends of the sleeve are, even after the completion of the socket member, still free to expand within the cap, for the curl at their upper ends affords resistance to prevent the pressure by which the socket is formed from entirely flattening the cap or fixedly binding the ends of the socket in the cap. A slotted eyelet the upper ends of which are confined within the cap and yet free to yield outwardly therein is, I believe, novel. The pressure which is required to expand the sleeve of the eyelet within the cap is not in the case of my fastener sufficient to fixedly bind the parts together, and for that reason is less than that employed in the manufacture of those fasteners where after the application of the formative pressure the parts are rigidly united.

I will now describe the stud member, as illustrated in Figs. 2, 4, 6, and 8. J is the ball portion, struck from a single piece of metal. Its contour is shown in Fig. 4. K is the stud-eyelet consisting of a sleeve $k$ and a flange $l$. The upper end of the sleeve of the eyelet K is thinned and slightly scalloped. Around the flange are indentations producing points $e\ e\ e$ upon the upper surface of the flange similar to those heretofore described in the socket-eyelet.

To unite the parts of the stud member, the eyelet is inserted in a suitable hole in the fabric and the ball portion placed upon the upper end thereof. Pressure is applied to the two parts until they assume the position shown in Fig. 2, where it will be noted that the rim of the ball portion has flattened itself against the fabric, while the upper end of the sleeve of the eyelet has crimped or bunched itself until it nearly fills the ball of the stud, effectually uniting the two portions of the stud member and binding the fabric between them. The points $e\ e\ e$ here serve the same useful function that they do in the socket member.

The two members are now completely formed. If the ball of the stud be forced into the socket, the slotted walls of the sleeve of the latter have sufficient resiliency to yield outwardly for its admission. In doing so, the upper end of the sleeve of the eyelet is forced outwardly into the cap; but it will be observed that neither of the binding portions of the socket member are required to move in relation to the fabric to which they are attached. Furthermore, the insertion of the ball of the stud into the socket tends to increase the prominence of the shoulder at the juncture of the sleeve $b$ and the flange $c$ by decreasing the angle at which they meet. This increases the hold of the socket upon the ball. In socket members where the flange of the socket-eyelet is cut through or where the parts of the compression member of the sleeve are not united at their lower end the expansion of the socket by the entrance of the stud decreases the prominence of this shoulder, lessening the efficiency of the fastener.

I have illustrated the socket member as formed with an eyelet having only three slots. This I find to be about the proper number for use in suspender-fasteners, where firmness is especially needed. For glove-fasteners the number of slots may be increased, say, to six, as shown in Fig. 9. In this way the resiliency of the socket is increased, making it easier to fasten and unfasten it.

Having thus described my invention, I claim—

1. A socket member for a ball-and-socket fastener, comprising a cap and a flanged eyelet, the eyelet having its sleeve slotted from its upper end downward, and the upper end of the slotted sleeve being expanded within the cap to engage its lower rim, the diameter of the expanded end of the sleeve being less than the interior diameter of the cap; substantially as described.

2. A socket member for a ball-and-socket fastener comprising a cap and a flanged eyelet; the eyelet having its sleeve slotted from its upper end downward, and the ends of the slotted sleeve being curled over within the cap with the extremities of the curled-over portions resting against the inner face of the lower rim of the cap; substantially as described.

3. A socket member for a ball-and-socket fastener, comprising a cap and a flanged eyelet, the eyelet having its sleeve slotted from its upper end downward, and the ends of the slotted sleeve being curled over within the cap with the extremities of the curled-over portions resting against the inner face of the lower rim of the cap, the diameter of the curled-over portions being less than the interior diameter of the cap; substantially as described.

4. A socket member for a ball-and-socket fastener, comprising a cap and a flanged eyelet; the eyelet having its sleeve slotted from its upper end downward, and the ends of the slotted sleeve being curled over within the cap, the curled-over portions being in contact with the inner surface of the top of the cap and in contact with the inner surface of its lower rim; substantially as described.

5. A socket member, for a ball-and-socket fastener, formed by the combination of a cap with a flanged eyelet; the sleeve of the eyelet being slotted from its upper end downwardly; and said slotted upper end of the eyelet-sleeve being expanded within the cap, the cap being so formed as to provide sufficient space about the expanded portion of the sleeve to permit the sleeve to yield outward within the cap, substantially as described.

6. A socket member, for a ball-and-socket fastener, formed by the combination of a cap with a flanged eyelet; the sleeve of the eyelet being slotted from its upper end downwardly; and said slotted upper end of the eyelet-sleeve being expanded and curled over within the cap, the cap being so formed as to provide sufficient space about the expanded portion of the sleeve to permit the sleeve to yield outward within the cap; substantially as described.

7. A socket member, for a ball-and-socket fastener, formed by the combination of a cap with a flanged eyelet; the sleeve of the eyelet being slotted from its upper end downwardly; but the flange of the eyelet being substantially integral; the slotted upper end of the sleeve being expanded within the cap, the interior diameter of the cap being greater than the diameter of the expanded portion of the sleeve, whereby the withdrawal of the sleeve from the cap is prevented but its expansion within the cap is permitted; substantially as described.

8. A socket member, for a ball-and-socket fastener, formed by the combination of a cap; and an eyelet, having a substantial integral flange, and a sleeve with slots extending from its upper end throughout its length and part way into the flange, but not impairing the substantial integrity of the flange; the relative sizes of the opening of the cap, and of the sleeve of the eyelet being such that when the slotted upper end of the sleeve is forced into the cap it expands and curls over until its ends lie close to the edge of the opening of the cap, whereby it is held from withdrawal from the cap, but at the same time is capable of yielding outwardly within it; substantially as described.

9. A socket member, for a ball-and-socket fastener, formed of but two pieces, namely, a cap and a flanged eyelet; the upper end of the eyelet being slotted, and expanded within the cap, but not fixedly held therein, the interior diameter of the cap being greater than the diameter of the expanded portion of the sleeve; substantially as described.

10. A ball-and-socket fastener, consisting of a non-resilient stud member; and a resilient socket member formed from a cap and eyelet; the eyelet being slotted at its upper end and expanded within the cap, with capacity to yield outwardly therein, the interior diameter of the cap being greater than the diameter of the expanded portion of the sleeve to permit of its outward yielding; substantially as described.

11. A socket member for a ball-and-socket fastener, comprising a cap and a flanged eyelet; the eyelet having its sleeve slotted at its upper end and expanded within the cap with capacity to yield outward therein, the interior diameter of the cap being greater than the diameter of the expanded portion of the sleeve, the flange of the eyelet being provided with points on its upper surface, which, when the socket member is formed, enter into and bind the fabric; substantially as described.

12. A ball-and-socket fastener, comprising a non-resilient ball member formed from a ball portion and an eyelet, the sleeve of the eyelet being crimped within the ball portion, the flange of the eyelet being provided on its upper surface with points for engaging the fabric, and a resilient socket member formed from a cap and eyelet, the sleeve of the eyelet being slotted at its upper end and expanded within the cap with capacity to yield outwardly therein, the interior diameter of the cap being greater than the diameter of the expanded portion of the sleeve; substantially as described.

In testimony whereof I have signed my name to this specification, this 25th day of April, 1903, in the presence of two subscribing witnesses.

MARC STERNBERG.

Witnesses:
JAMES H. BELL,
M. KATIE TRUMBORE.